UNITED STATES PATENT OFFICE.

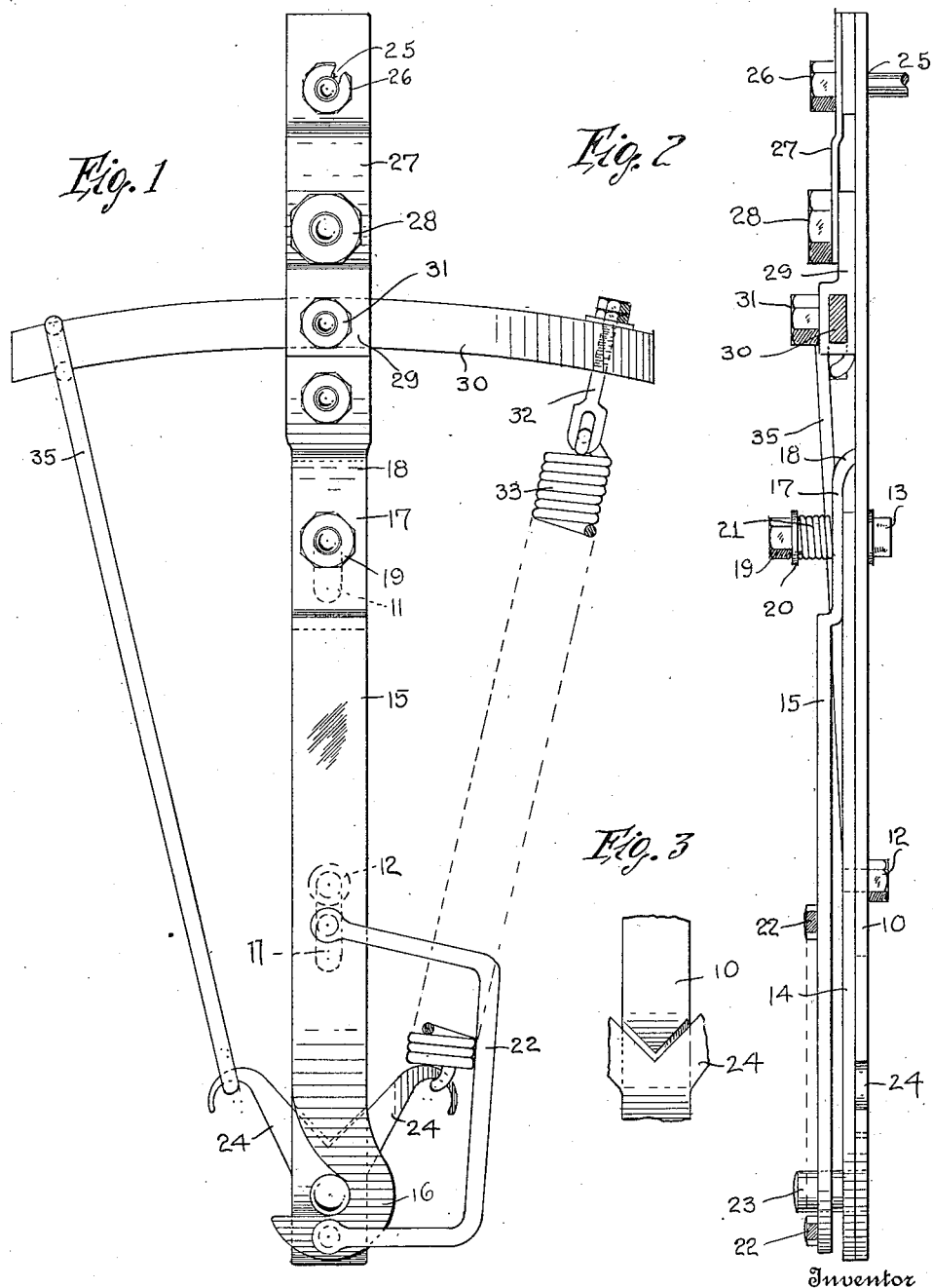

ALLEN A. YATES, OF LAKE BENTON, MINNESOTA.

WINDMILL-COUPLING.

1,064,584. Specification of Letters Patent. Patented June 10, 1913.

Application filed February 13, 1912. Serial No. 677,393.

*To all whom it may concern:*

Be it known that I, ALLEN A. YATES, a citizen of the United States, residing at Lake Benton, county of Benton, and State of Minnesota, have invented a new and useful Windmill-Coupling, of which the following is a specification.

This invention relates to sucker rod couplers and has special reference to a spring coupler for devices of this description.

The principal object of the invention is to provide a spring coupler of improved construction especially adapted for coupling the sucker rod of a pump to a wind mill rod.

With the above and other objects in view the invention consists in general of certain novel constructions, combinations, and arrangements of parts, as will be hereinafter fully described, illustrated in the accompanying drawings, and specifically claimed.

In the drawing:—Figure 1 is a front view of a coupling constructed in accordance with this invention. Fig. 2 is a side view thereof. Fig. 3 is a side elevation of a portion of the lower end of the main member of the coupling.

In the construction of this coupling there is employed a main member 10 having slots 11 therein wherethrough pass bolts 12 and 13, which bolts are respectively screwed into and pass through a sliding member 14. The bolt 13 is extended through the member 14 and carries an arm 15 which is provided at one end with a hook 16, the body of the arm having at its opposite end an offset portion 17 wherethrough the bolt 13 passes and the end of this offset portion is bent downwardly as at 18 to bear against the member 10 and frictionally engage therewith.

On the bolt 13 is a nut 19 and washer 20 and between the washer and the offset portion 17 is a coil spring 21 which serves to yieldably hold the member 15 in position. Secured to the hook end of the member 15 is a handle 22 by means of which the member can be revolved around the bolt 13 as a pivot. Passing through the member 14 is a pin 23 which is fixed in this part and the hook 16 engages the outer end of the pin so that when the hook is disengaged the pin may pass through a sucker rod and the hook then engaged to hold the pin in position.

On the member 14 are formed inverted hooks 24 for purpose hereinafter to be described. The upper end of the device is provided with suitable openings to receive bolts 26 by means of which the device may be attached to the wind mill rod. Secured to the upper extremity of one of the bolts 26 is a plate 27 and through this plate and the member 10 passes a bolt 28.

Between the plate 27 and member 10 is pivoted a slot hanger 29 through which passes an equalizer bar 30 held fixed in said hanger in adjusted position by means of a set screw 31. At one end of this hanger there is secured an eye bolt 32 to which is connected one end of a coil spring 33, the other end of said spring being connected to one of the inverted hooks 24. To the other end of the equalizer 30 is connected one end of a link 35, the remaining end being connected to the remaining hook 24.

When this device is connected by means of bolts 26 and pin 23 to the wind mill sucker rod, the upward movement of the wind mill rod will be taken up and the shock relieved by the yielding of the spring 33, and it is to be noted that by adjusting the equalizer 30 the force required will be made greater or less according as the spring is moved outward from or in toward the member 10.

There has thus been provided a simple and efficient device of the kind described, and for the purpose specified.

Having thus described the invention, what is claimed as new, is:—

In a device of the kind described, a member adapted for connection to a wind mill rod, a second member slidable on the first member, a pin carried by the second member for connecting said member to a sucker rod, a hook mounted on the second member and pivoted with reference thereto, said hook being engageable with said pin to form a keeper for the sucker rod, a slotted hanger pivoted to the first member, an equalizer lever passing through said hanger, a set screw for holding said equalizing lever in adjusted position, a pair of inverted hooks extending laterally from the second member, a link connecting one of said hooks with one end of the equalizer lever, and a spring connecting the remaining hook with the remaining end of the equalizer lever.

Dated Lake Benton, Minnesota, January 17th, A. D. 1912.

ALLEN A. YATES.

Attested by—
 CHAS. E. LARSSON,
 C. W. STITES.

Copies of this patent may be obtained for five cents each, by addressing the "Commissioner of Patents, Washington, D. C."